UNITED STATES PATENT OFFICE.

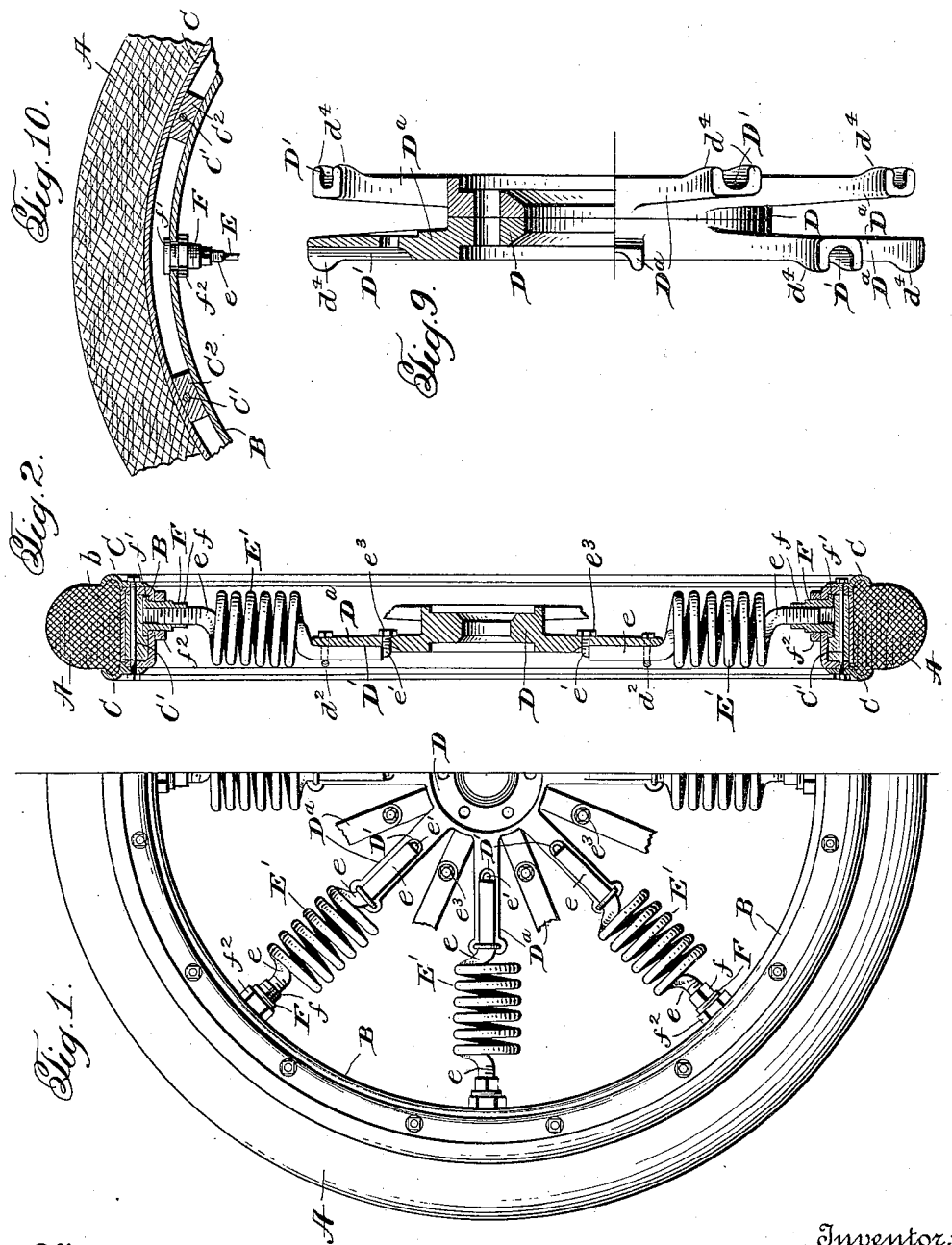

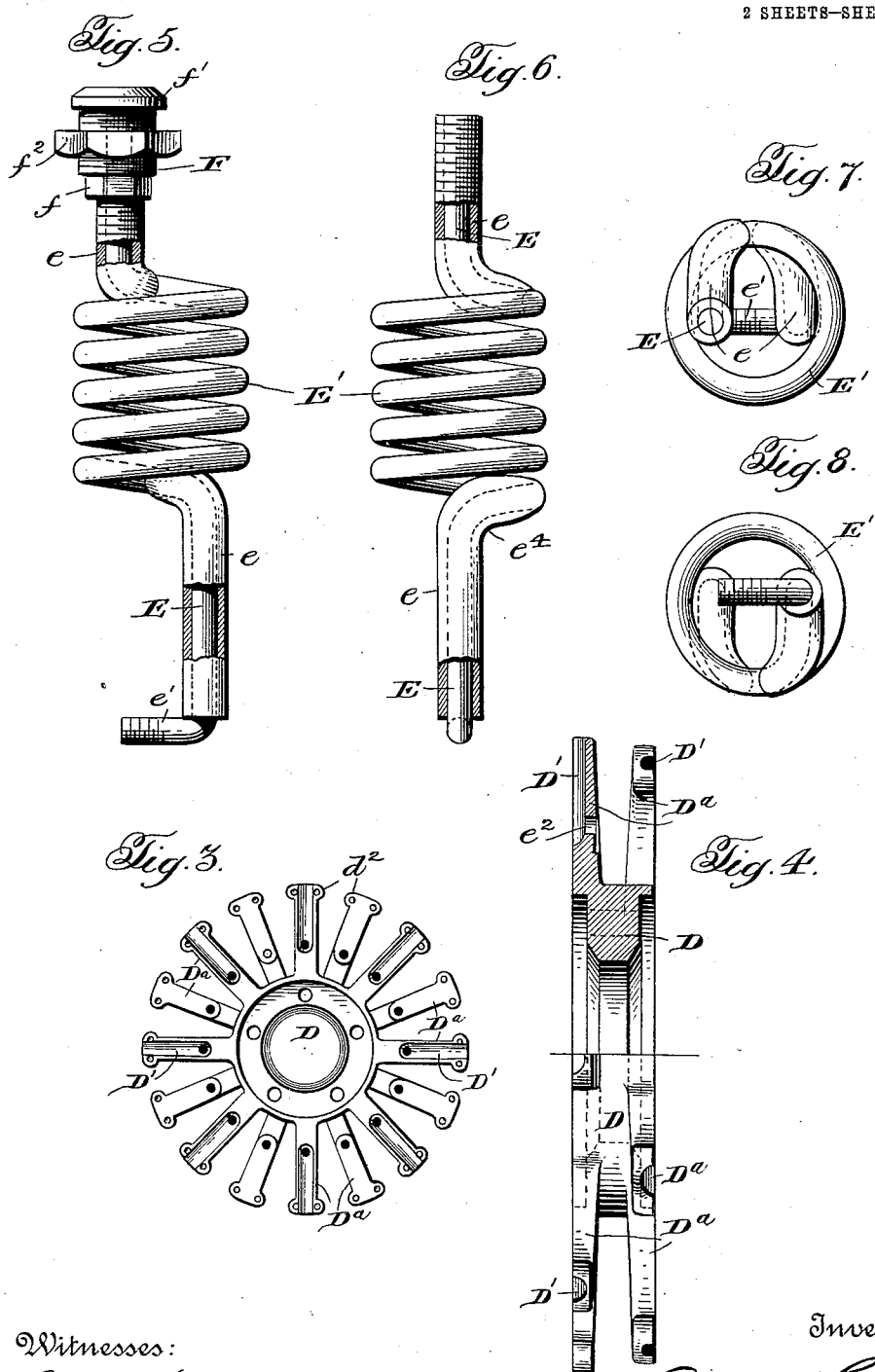

ADOLPH SCHICK, OF WHEELING, WEST VIRGINIA, ASSIGNOR TO SCHICK WHEEL AND TIRE CO., A CORPORATION OF WEST VIRGINIA.

VEHICLE-WHEEL.

1,076,239.  Specification of Letters Patent.  Patented Oct. 21, 1913.

Application filed August 27, 1912. Serial No. 717,400.

*To all whom it may concern:*

Be it known that I, ADOLPH SCHICK, citizen of the United States, residing at Wheeling, in the county of Ohio and State of West Virginia, have invented certain new and useful Improvements in Vehicle-Wheels, of which the following is a specification, reference being had therein to the accompanying drawing.

This invention relates to an improvement in what is now known in the arts as spring wheels.

The invention pertains more particularly to a wheel wherein a substantially rigid rim member is connected to and supported from the hub member by yielding spoke members and such spokes are in part of coiled spring formation.

In the class of wheels, it is recognized that simplicity in structure, plus a minimum number of parts is a desideratum to be appreciated and sought for.

The aim and purpose of my present invention is to construct a wheel wherein the parts will be relatively few in number and so associated as to render the wheel strong and durable, while adapted for receiving not only torsional, but also side strains without collapsing or breaking down.

One of the objects of the invention is to provide a spring wheel of the character above indicated wherein the spring spoke members can be very readily removed and replaced without the assistance of a skilled mechanic and without the employment of other tools than a wrench.

A further object of the invention is to provide a construction wherein the spoke members are properly supported and reinforced at the weaker points thereof, not only against lateral, but also against longitudinal strains, and finally, the main object of the invention is to provide a spring wheel which will satisfactorily meet the requirements of service, be simple in construction and inexpensive, and which will possess the minimum number of parts.

In my Patent No. 1019192 of March 5, 1912, I have shown a type of wheel similar to the one presently to be described. It is found, however, that a construction such as shown in the said patent had points of weakness as to structural and connected parts and that also it was somewhat difficult to replace broken spokes with new ones. In my present construction the aim has been to overcome the objections found in the previous structure.

In the accompanying drawings there is illustrated an embodiment of the invention, but it is to be understood that many minor changes can be made without departing from the nature and principle thereof.

In the drawings: Figure 1 represents in elevation a wheel embodying the invention showing parts broken away; Fig. 2 is a longitudinal central section showing the hub thimble portion omitted; Fig. 3 is a detail elevation of the hub member; Fig. 4 is an enlarged edge view of the same, partly in section, Figs. 5, 6, 7 and 8 are elevations and plans of the spoke member showing parts broken away, Fig. 9 is a detail view of a modified form of hub part, and Fig. 10 is a longitudinal section through the rim.

In the drawings A represents the tire member which in this connection is shown as a solid rubber tire, although any form of tire may be employed. The tire A is secured in a rim comprising conveniently a channel member B, having its flanges extending outward. These flanges are rabbeted at their inner edges and support thereon the tire supporting band $b$. On each side of the channel member B are the clamping members C having the usual hook-shaped outer edges and flat inner edges embracing closely the outer faces of the flanged rim B, as shown in Fig. 2. To maintain the clamping rings in position, suitable bolts C' are employed which pass through the flanges of the clamping plates and the outstanding channel member. To add rigidity to the structure and to reduce vibration, suitable wooden blocks are placed in the channel rim, as at $C^2$, the same spanning the interior and abutting respectively the inner faces of the outstanding flanges. The bolts C' pass through the blocks, and as the bolts are tensioned through the nut on their ends, as shown, the parts are firmly clamped together and retained in place.

D represents the hub member which is conveniently in the form of a casting, although pressed metal parts may be employed. The hub is provided with a series of radial arms $D^a$, which arms are of tapered formation and have formed in their outer faces spoke seats D'. The arms are spaced apart and those on one face of the hub are arranged on a plane intermediate those of the other face for purposes presently to be described. I have found in practice that sixteen arms and spokes are sufficient to produce a wheel having the proper rigidity but desire it understood that any convenient number can be employed.

E designates the spoke member, the same being in the form of a bar having its central portion coiled to constitute a spring E'. The coils of the spring are spaced apart so that the spring can compress as well as expand and the end parts of the spring are bent inward toward the axis of the coil as shown in Figs. 7 and 8. The ends of the bar above and below the coil are conveniently extended outward and are provided substantially throughout with a reinforcing sleeve $e$. These sleeves are conveniently driven onto the stem prior to their being bent into the position shown and are there secured in any convenient manner, forming substantially a complete reinforcement throughout the entire stem. This reinforcement is important, especially at the bend, which I have ascertained is the weakest part of the spoke, and in that particular it may be stated that the same parts are reinforced or strengthened from the coiled parts of the spoke. The outer stems are conveniently threaded while the ends of the inner stem parts are turned at right angles, as at $e'$ and threaded as shown particularly in Figs. 2, 5 and 6. The length of the stems of the spokes is substantially the length of the grooves D' of the hub and the angle ends $e'$ are passed through openings in the hub arms located adjacent the inner ends of the seats D', as shown at $e^2$. They are there provided with nuts $e^3$ and, owing to the position of the hub arm with relation to the other outwardly disposed arms, it will readily be seen that access can be had to the nuts $e^3$ and by the employment of a wrench the nuts can be readily removed. The outer stems of the spokes are as stated, threaded, and are received in internally threaded nipples F. These nipples have wrench holds $f$ at their inner ends and substantially flat bearing heads $f'$ at their outer ends. The nipples are also provided with threads on their outer surfaces upon which may be mounted a jam nut $f^2$.

In Figs. 7 and 8 the ends of the spokes E are shown as projected inwardly intermediate the circle of the coils and the center thereof. I have also shown the stems as being conveniently arranged diagonally opposite each other as best illustrated in Fig. 5 so that the line of vertical stress will be directed somewhat diagonally from the rim at one side to the hub at the opposite side. The various spokes are arranged in that particular alternate so that side thrusts upon the wheel are resisted not only by the natural or normal spring resistance, but also by the direct pulling resistance of the spring as referred to in my aforementioned patent.

In assembling the parts I have found it convenient to so position the spoke arm with relation to the inner stem of the spoke that the upper edge of the seat D will bear against the reinforcing part $e^4$ of the stem. This arrangement affords a very substantial support for the spoke and serves also as a means for strengthening the connection between the spoke and the hub. I have also found it convenient to employ U-clips passing through eyes $d^2$ in the outer ends of the spoke arms and embracing a stem of the spokes. This latter feature, however, may be omitted and a construction similar to that shown in Fig. 9 employed wherein the outer ends of the spoke arms are provided with ears $d^4$ which serve to prevent the spokes from escaping from the spoke seats D'.

A wheel constructed as above described possesses the characteristic of having a minimum number of parts and the required rigidity. Should a spring spoke crack, it is only necessary for the operator to relieve the tension under which the springs are normally placed by applying his wrench to the nipple part F and turning the same in its seat in the channel rim, thus unscrewing the other stem of the spoke and then by removing the nut $e^3$ from the inner end of the spoke and the clip member the entire spoke can be removed. It will be observed that the nipple is a fixed part of the wheel and has its head seated in the channel member of the rim while its portion directly below in the hub is free to move in the aperture formed in the rim. In replacing the spoke it is only necessary to insert the end of the outer stem in the nipple, turn the nipple sufficiently to draw the spoke outward until its bent inner end is in substantial alinement with the aperture at the base of the spoke seat. The bent end is then forced through the aperture and the nut applied thereto. By the use of a wrench it is now only necessary to rotate the nipple, drawing the spoke end up into the rim or nipple until the spoke is under proper tension. The set nut $f^2$ can then be tightened onto the rim and the spoke is secured fixedly in its proper position and under proper tension.

The construction described may be modified somewhat in various details without departing from the invention defined in the claims appended.

I claim:—

1. In a spring wheel, the combination with a rim member and a hub member, of a series of spokes connecting the two members provided with intermediate coiled portions, and with outer stem parts, said stem parts and the adjacent portions of the coils being of greater diameter than the central part of the coiled portion of the springs.

2. In a spring wheel, the combination with a rim and hub, of a series of coiled spring spokes, provided with outwardly extending stems, reinforcements for the stems of the spokes extending substantially throughout the length of the stems and the adjacent portion of the coiled part of the spoke, and means for detachably securing the spokes to the frame and hub.

3. In a spring wheel, the combination with a rim, of a hub having a series of radial laterally spaced arms at opposite sides thereof, the arms on one side being arranged intermediate the arms of the other side, each arm being provided with a depression in one face thereof forming a spoke seat, spring spokes having their inner ends secured in the seats of the said arms and having threaded outer ends, and adjustable connections between the threaded outer ends and the said rim.

4. A spoke for spring wheels having a coiled portion, and a stem part extending therefrom, and a tubular reinforcing member inclosing the stem part and a portion of the coiled part of the spoke.

In testimony whereof I affix my signature in presence of two witnesses.

ADOLPH SCHICK.

Witnesses:
    CALVIN T. MILANS,
    PRESTON BACON.

Copies of this patent may be obtained for five cents each, by addressing the "Commissioner of Patents, Washington, D. C."